United States Patent [19]

Nagashima et al.

[11] Patent Number: 4,756,396
[45] Date of Patent: Jul. 12, 1988

[54] CENTRIFUGAL CLUTCH

[75] Inventors: Akira Nagashima, Kawasaki; Junichi Hiraizumi, Tokyo, both of Japan

[73] Assignee: Kioritz Corporation, Tokyo, Japan

[21] Appl. No.: 49,810

[22] Filed: May 12, 1987

Related U.S. Application Data

[63] Continuation of Ser. No. 885,340, Jul. 10, 1986, abandoned, which is a continuation of Ser. No. 647,426, Sep. 5, 1984, abandoned.

[30] Foreign Application Priority Data

Sep. 6, 1983 [JP] Japan .................. 58-137934[U]

[51] Int. Cl.$^4$ ............................................. F16D 43/18
[52] U.S. Cl. ................................ 192/105 BA; 192/76; 192/103 B
[58] Field of Search ......... 192/105 BA, 103 B, 104 B, 192/105 BB, 76

[56] References Cited

U.S. PATENT DOCUMENTS

| | | | |
|---|---|---|---|
| 2,730,219 | 1/1956 | Kitto | 192/105 BA |
| 2,753,967 | 7/1956 | Bowers | 192/105 BA |
| 2,868,343 | 1/1959 | Spizoul | 192/105 BA |
| 2,947,399 | 8/1960 | Moore et al. | 192/105 BA |
| 3,204,737 | 9/1965 | Anner | 192/105 BA |
| 3,367,464 | 2/1968 | Fullerton et al. | 192/105 BA |
| 3,477,555 | 11/1969 | Hazzard | 192/105 BA |
| 3,519,037 | 7/1970 | Linkfield | . |
| 3,640,365 | 2/1972 | Henry | . |
| 3,734,070 | 5/1973 | Kobayashi et al. | . |
| 3,768,611 | 10/1973 | Frederickson | . |
| 4,227,601 | 10/1980 | Pilatowicz | 192/105 BA |

FOREIGN PATENT DOCUMENTS

| | | | |
|---|---|---|---|
| 340102 | 9/1959 | Switzerland | 192/105 BA |
| 806400 | 12/1958 | United Kingdom | 192/105 BA |

Primary Examiner—Rodney H. Bonck
Assistant Examiner—Richard M. Lorence
Attorney, Agent, or Firm—Browdy and Neimark

[57] ABSTRACT

A centrifugal clutch including a drive member, a plurality of intermediate members, a driven member and closing plates each having shape and weight conforming to a side wall of each intermediate member to provide dynamic balance for the clutch. When the drive member rotates sufficiently fast, the intermediate members move radially outward along respective parts of the drive member, against the bias of a peripherally extending spring held in place as to each intermediate member by the respective closing plate.

5 Claims, 2 Drawing Sheets

CENTRIFUGAL CLUTCH

This application is a continuation, of application Ser. No. 885,340, filed July 10, 1986 now abandoned, which is a continuation of application Ser. No. 647,426, filed Sept. 5, 1984 now abandoned.

BACKGROUND OF THE INVENTION

(1) Field of the Invention

This invention relates to a centrifugal clutch for a portable power driven machine and connected to a power source for transmitting the driving power.

(2) Description of the Prior Art

In a portable power driven machine, such as a chain saw, a grass trimmer, etc., it has hitherto been desired that all parts be light in weight and small in size to obtain an overall compact size and a light weight of the machine. Of all the parts of this type of machine, development of a lightweight and small-size centrifugal clutch for transmitting driving power from an internal combustion engine built in the machine to serve as a power source has been delayed as compared with other parts. This is largely due to the fact that difficulties are experienced, if the centrifugal clutch is light in weight and small in size, in achieving dynamic balance in the centrifugal clutch when it is rotated. Centrifugal clutches of the prior art are generally of a construction in which a plurality of drive members forming a pair are located in face-to-face relation on a rotary shaft of the internal combustion engine, and an intermediate member and a driven member are located in association with the pair of drive members respectively. This construction has made it difficult to achieve dynamic balance in a centrifugal clutch unless it is made heavy in weight and relatively large in size.

SUMMARY OF THE INVENTION

(1) Object of the Invention

This invention has been developed for the purpose of obviating the aforesaid disadvantages of the prior art. Accordingly, the invention has as its object the provision of a centrifugal clutch, suitable for use with a portable power driven machine, which is fewer in the number of parts, lighter in weight and easier to achieve balance than centrifugal clutches of the prior art.

(2) Statement of the Invention

According to the invention, there is provided a centrifugal clutch comprising a drive member connected to a power source for rotation, a driven member of a substantially cylindrical configuration spaced radially outwardly apart from the drive member and located concentrically therewith, a plurality of projections formed in the drive member in a manner to be located equiangularly of each other peripherally of the drive member and extending radially outwardly therefrom, a plurality of intermediate members each formed with a recess for allowing one of the projections of the drive member to be slidably engaged therein, each of the intermediate members being mounted to one of the projections for movement therealong outwardly into frictional engagement with the driven member, and an annular spring mounted in a manner to extend through transverse grooves each formed in the intermediate members to bias the intermediate members inwardly, and closing plates each mounted to a lateral side of the intermediate members to close the recess and transverse groove of the respective intermediate member and adjust dynamic balance.

Each of the closing plates has a shape and a weight conforming to a side wall of each of the intermediate member facing one of the closing plates in such a manner that a smooth and balanced rotary movement is achieved in the centrifugal clutch.

In the centrifugal clutch according to the invention, the drive member, intermediate members and driven member are arranged in a single row, and the closing plates having a shape and a weight conforming to the side wall of each of the intermediate members are provided to the respective intermediate members. By virtue of this feature, the centrifugal clutch is compact in size and light in weight and rotates smoothly in a balanced manner with a minimum of vibration.

DESCRIPTION OF THE PREFERRED EMBODIMENT

The invention will now be described by referring to a chain saw incorporating therein one embodiment of the centrifugal clutch in conformity with the invention, shown in the accompanying drawings.

Figure 1:
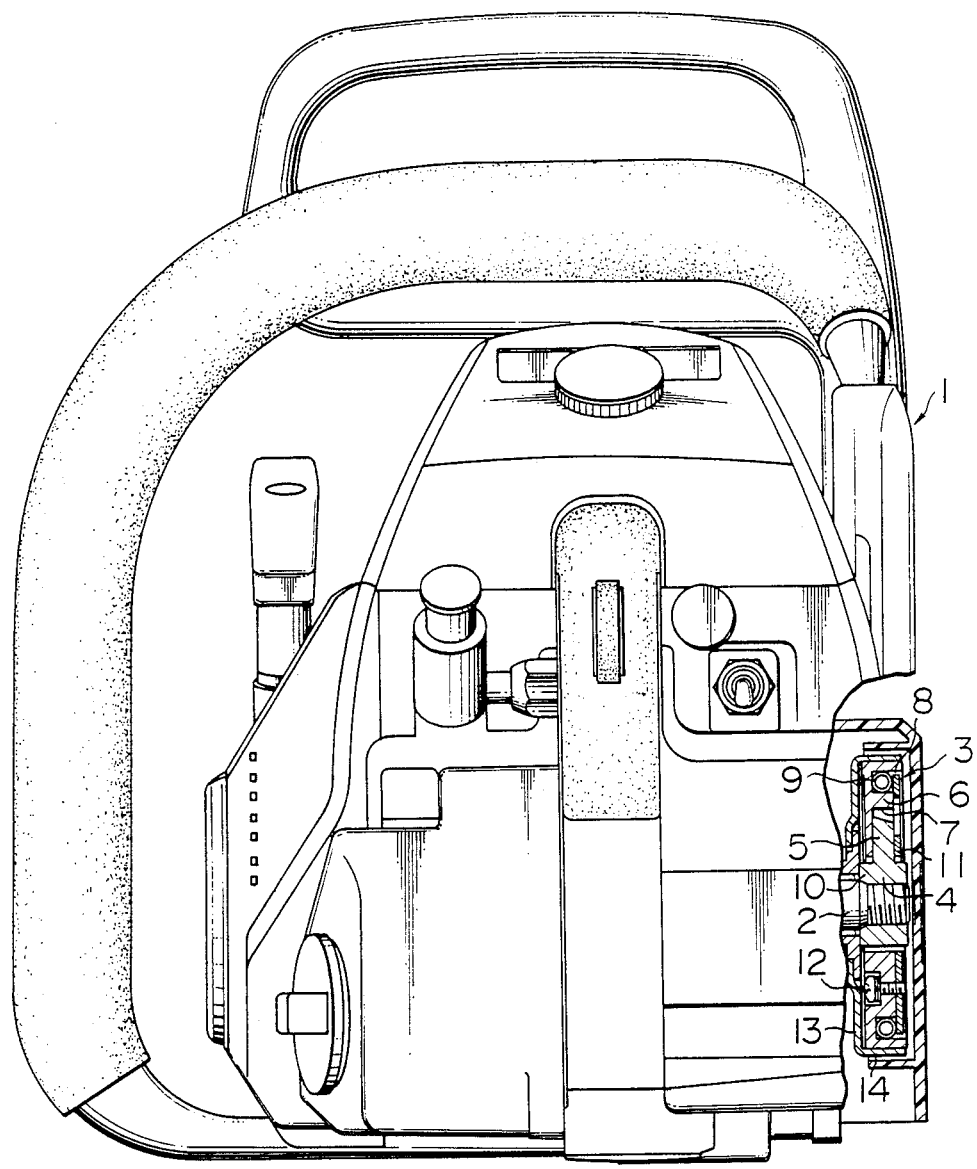
FIG. 1 is a back view, with certain parts being broken away, of a chain saw incorporating therein the centrifugal clutch comprising one embodiment of the invention.

The chain saw generally designated by the reference numeral 1 in FIG. 1 comprises an internal combustion engine, not shown, mounted therein to serve as a power source and having a rotary shaft 2 which mounts a centrifugal clutch 3 according to the invention. The centrifugal clutch 3 is drivingly connected to a sprocket wheel, not shown, engaging a saw chain having cutting teeth and operates such that the rotation of the rotary shaft 2 is transmitted to the sprocket wheel to drive the saw chain to cut a tree or the like.

Figure 2:
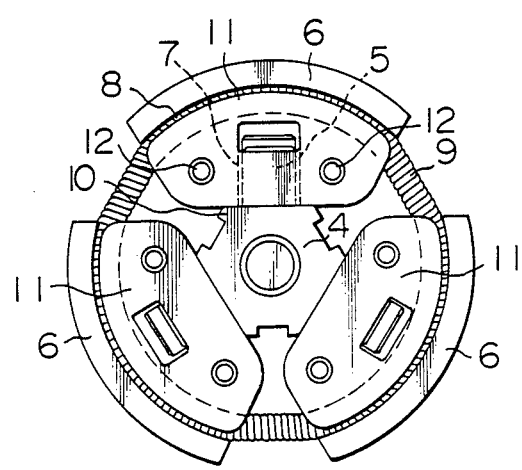
FIG. 2 is a front view of the centrifugal clutch shown in FIG. 1, with certain parts being removed.

The centrifugal clutch 3 comprises a drive member 4 secured to the rotary shaft 2. As shown in FIG. 2, the drive member 4 includes three projections 5 equiangularly spaced apart from each other peripherally of the drive member 4 and extending radially outwardly therefrom. The centrifugal clutch 3 further comprises three intermediate members 6 each of which is formed with a recess 7 extending radially and open at a radially inward end and at one lateral side thereof to allow one of the projections 5 of the drive member 4 to be loosely engaged therein to slidingly guide the respective intermediate member 6 radially with respect to the drive member 4. The intermediate members 6 are each formed near an outer peripheral end thereof with a transverse groove 8 which is also open at one lateral side of the respective intermediate member 6 like each recess 7. An annular spiral spring 9 is mounted in the transverse grooves 8 of the intermediate members 6 to bias the three intermediate members 6 radially inwardly, to force an inner end of each of the intermediate members 6 against one of stepped portions 10 of the drive member 4 to hold the intermediate members 6 in inoperative positions.

A closing plate 11 formed of a material of a relatively large mass, such as steel, is connected to the one lateral side of each intermediate member 6 by screws 12, so that the recess 7 and transverse groove 8 at the one lateral side of each intermediate member 6 are closed by one of the closing plates 11. Each of the closing plates 11 has a shape and a weight conforming to a side wall of each of the intermediate members 6 such that a smooth and balanced rotary movement is achieved in the centrifugal clutch 3.

The centrifugal clutch 3 further comprises a driven member 13 supported by the rotary shaft 2 concentrically with the drive member 4 for rotation independently of and separately from the drive member 4. The driven member 13 includes a cylindrical portion 14 having an inner peripheral surface which is spaced apart a predetermined distance radially outwardly from an outer peripheral end of each intermediate member 6 when the intermediate members 6 are in the inoperative positions.

In operation, when the rotary shaft 2 of the internal combustion engine, that is, the drive member 4 of the centrifugal clutch 3 exceeds a predetermined rotational speed during rotation, the three intermediate members 6 are caused by centrifugal forces to slidingly move outwardly along the respective projections 5 against the biasing force of the spring 9, and the outer peripheral ends of the intermediate members 6 are brought into frictional engagement with the inner peripheral surface of the cylindrical portion 14 of the driven member 13, to thereby transmit the force of rotation of the drive member 4 to the driven member 13. This moves the sprocket wheel unitary with the driven member 13 to drive the saw chain. When the rotational speed of the rotary shaft 2 or the drive member 4 of the centrifugal clutch 3 falls below the predetermined rotational speed, the spring 9 biases the intermediate members 6 radially inwardly, so that the latter separate themselves from the inner peripheral surface of the cylindrical portion 14 of the driven member 13. Thus, the transmission of the force of rotation from the drive member 4 to the driven member 13 is interrupted.

What is claimed is:

1. A device including a centrifugal clutch connected to a power source of a portable power driven machine to transmit rotatory driving power thereof, said device comprising:

a drive member nonrotatably connected to a rotary shaft which extends from a first side of said drive member to the power source for rotation;

a driven member of a substantially cylindrical configuration spaced radially outwardly apart from the drive member and located concentrically therewith;

a plurality of projections formed in the drive member in a manner to be located equiangularly of each other at the periphery of the drive member and to extend radially outwardly therefrom;

a plurality of intermediate members, each having a first lateral side on the opposite side from said first side of said drive member and a second lateral side on the side opposite said first lateral side, and being formed with a recess in said first lateral side for allowing one of the projections of the drive member to be slidably engaged therein, each of said intermediate members having a radially outward peripheral surface and being mounted on a respective one of said projections for movement therealong radially outwardly into frictional engagement of said radially outward peripheral surface of each said intermediate member with the driven member;

a single annular helical spring centrally mounted in a manner to extend through transverse grooves formed in said first lateral sides of the intermediate members to bias the intermediate members radially inwardly, wherein, when the rotational velocity of said rotary shaft and drive member is sufficiently large, said radially outward movement of said intermediate members occurs along the respective projections of said drive member against the bias of said helical spring to operatively engage an inner cylindrical surface of said driven member; and respective closing plates mounted by respective connecting means to a respective area of each of said first lateral sides of the intermediate members, to effectively close the recess and transverse groove of the respective intermediate member, and to adjust dynamic balance of the clutch by providing with said intermediate members a substantially equal mass distribution with respect to a plane passing through the center of said projections and perpendicular to the axis of rotation of said power source, drive member and driven member, said plane containing the center of said helical spring, said intermediate members each having a screw head recess on said second lateral side to receive a screw head therein, each said connection means comprising a screw having a screw head and extending through the thickness of each said intermediate member and engaging with said closing plate, with the head of said screw being fully recessed with the screw head recess, and said area of said first lateral side of each said intermediate member where the respective closing plate extends being recessed, so that a surface of each said closing plate opposite a surface contacting the recessed area of the intermediate member effectively forms a plane with a respective surface of the rest of the first lateral side of the intermediate member, said rest of the first lateral side of each said intermediate member providing said radially outward peripheral surface of the intermediate member.

2. The device of claim 1, having three of each of said projections of said drive member and said intermediate members.

3. The device of claim 1, wherein said transverse groove of each said intermediate member separates said recessed part of the first lateral side of the intermediate member from said rest of the first lateral side.

4. The device of claim 3, wherein each said closing member consists of a major part that has effectively the same peripheral shape as said recessed part of the respective intermediate member, and of a minor part extending radially outward from said major part to extend at least in part over said transverse groove of the intermediate member.

5. The device of claim 1, wherein only said spring is present in said transverse grooves.

* * * * *